(12) United States Patent
Alfano

(10) Patent No.: US 8,275,498 B2
(45) Date of Patent: Sep. 25, 2012

(54) SYSTEM AND METHOD FOR ASSESSING THE RISK OF CONJUNCTION OF A ROCKET BODY WITH ORBITING AND NON-ORBITING PLATFORMS

(75) Inventor: Salvatore Alfano, Monument, CO (US)

(73) Assignee: Analytical Graphics Inc., Exton, PA (US)

( * ) Notice: Subject to any disclaimer, the term of this patent is extended or adjusted under 35 U.S.C. 154(b) by 177 days.

(21) Appl. No.: 12/848,462

(22) Filed: Aug. 2, 2010

(65) Prior Publication Data

US 2012/0013478 A1    Jan. 19, 2012

Related U.S. Application Data

(63) Continuation-in-part of application No. 12/837,959, filed on Jul. 16, 2010.

(51) Int. Cl.
*B64G 1/36* (2006.01)

(52) U.S. Cl. .................. 701/13; 701/3; 701/27; 701/77; 701/86; 701/102; 340/815.4; 244/2; 244/63; 244/158.1; 244/158.5; 244/159.3; 60/39.76; 60/39.38; 60/204; 60/247; 89/1.8; 89/1.801; 114/259

(58) Field of Classification Search ................ 701/3, 13, 701/27, 77, 86, 102, 103, 104, 105, 106, 701/124, 31.2, 31.3, 31.4, 34.2, 34.3, 216, 701/528, 531; 244/2, 63, 158.1, 158.5, 159.3, 244/164, 171, 171.3, 171.4, 171.6, 173.1, 244/173.3; 89/1.8, 1.801, 1.805, 1.815; 60/39.76, 60/39.38, 204, 247; 340/815.4; 114/259
See application file for complete search history.

(56) References Cited

U.S. PATENT DOCUMENTS

| | | | | |
|---|---|---|---|---|
| 5,178,347 A * | 1/1993 | Johnson et al. | ............ | 244/158.5 |
| 5,494,239 A * | 2/1996 | Giacomel | ...................... | 244/3.1 |
| 6,612,522 B1 * | 9/2003 | Aldrin et al. | ...................... | 244/2 |
| 6,833,804 B2 * | 12/2004 | Atar | ................... | 342/10 |
| 6,923,404 B1 * | 8/2005 | Liu et al. | .................... | 244/46 |
| 6,965,816 B2 * | 11/2005 | Walker | ............................ | 701/16 |
| 2004/0176883 A1 * | 9/2004 | Belbruno | ........................ | 701/13 |
| 2006/0208136 A1 * | 9/2006 | Cook | .......................... | 244/171.3 |
| 2010/0320312 A1 * | 12/2010 | Bril et al. | ...................... | 244/3.16 |

* cited by examiner

*Primary Examiner* — James Trammell
*Assistant Examiner* — McDieunel Marc
(74) *Attorney, Agent, or Firm* — The Marbury Law Group, PLLC

(57) ABSTRACT

A system and method for assessing the risk of conjunction of a rocket body with orbiting and non-orbiting platforms. Two-body orbital dynamics are used to initially determine the kinematic access for a ballistic vehicle. The access may be represented in two ways: as a volume relative to its launcher and also as a geographical footprint relative to a target position that encompasses all possible launcher locations.

20 Claims, 11 Drawing Sheets

SYSTEM AND METHOD FOR ASSESSING THE RISK OF CONJUNCTION OF A ROCKET BODY WITH ORBITING AND NON-ORBITING PLATFORMS

This application is a continuation in part of U.S. application Ser. No. 12/837,959 filed Jul. 16, 2010. The Ser. No. 12/837,959 application is incorporated by reference in its entirety for all purposes.

BACKGROUND

There is a growing concern about the possibility of a rocket launch conjuncting with a low earth orbiting satellite, either accidentally or intentionally. The conjunction of the launched rocket and an orbiting platform presents a serious risk to life and property on earth. Recent deliberate interceptions of orbiting platforms by earth-launched rockets also fuel these concerns.

SUMMARY

Embodiments are directed to systems and methods for producing display constructs that provide a visual representation of the accessibility of orbiting and non-orbiting platforms (collectively, a "target platform") to a rocket launched from an earth-based platform.

A rocket body has "access" to a target platform when the rocket body can occupy the same position and time of a specified platform or a geographical region. In an embodiment, an assessment tool determines whether an orbiting platform is accessible to ground-, sea-, and air-launched rockets for both ascending and descending intercept trajectories. In another embodiment, the assessment tool determines whether a non-orbiting platform is accessible to ground-, sea-, and air-launched rockets for both ascending and descending intercept trajectories.

DETAILED DESCRIPTION

Figure 1:
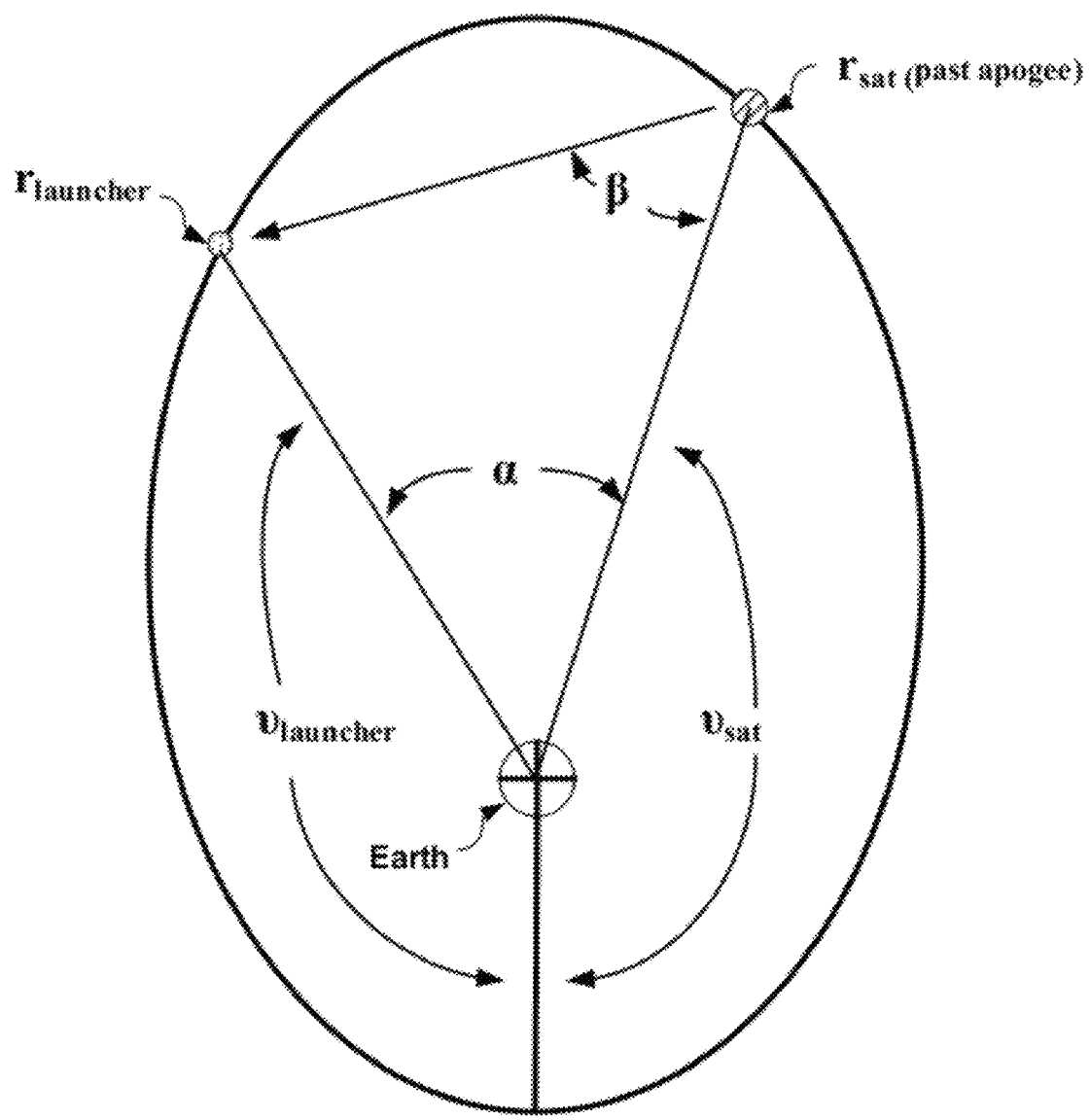
FIG. 1 is a graphical representation illustrating a descending (all-inclusive) profile where the access occurs after the rocket's apogee.

A rocket may have three phases of flight: the boost phase (launch to burnout), the midcourse phase (coast or free-flight), and the terminal phase (final guidance to precisely arrive at a designated position/velocity). Several simplifying assumptions may be made to initially assess access opportunities.

Using an Earth-Centered, Earth-Fixed (ECEF) ephemeris for a given rocket, the final orbital energy in the Earth-Centered Inertial (ECI) frame may be deduced from the state of the rocket at burnout. Staging, mass loss, and atmospheric drag effects can all be included to arrive at the proper burnout state.

In the ECI frame, this final orbital energy is the total cumulative energy imparted to the rocket during boost. For preliminary analysis this energy may be assumed attainable and constant regardless of launch direction, trajectory, dynamic losses, or guidance program. An initial determination of access opportunity may then be made by assuming the rocket is given all its energy at launch and follows a ballistic trajectory to an orbital, suborbital or non-orbital platform, thereby approximating all three phases as one simple phase.

While the description that follows may specifically reference orbiting platforms, the application is not so limited. Because no restriction is placed on the altitude of the targeted platform, the equations and algorithms are also valid for non-orbiting platforms. In addition, no lower limit is placed on the velocity of the "rocket" at burn out making the equations and algorithms valid for slower projectiles such as artillery shells, mortars, and surface-to-air missiles.

In an embodiment, the effect of earth rotation is addressed by transforming from the ECEF frame to an ECI frame as needed.

In embodiment, an "alert" determination of accessibility may be made by using a rocket's final ECEF or ECI energy to generate geometric models that represent a risk of access of an orbiting platform to a launch of a particular rocket. In an embodiment, the alert determination may be made by an access determination device. If an alert determination is made, an operator of an orbital platform may take additional steps to more precisely assess the accessibility of the targeted platform to the rocket in question.

In an embodiment, a kinematic access volume relative to the rocket's launch platform is determined by creating a sufficient family of forward trajectories based on different initial launch azimuths and elevations. Entry and exit times through this volume define the bounds of platform access for a specific launcher and specific type of rocket on an ascending or descending intercept profile.

In another embodiment, a kinematic access region may be represented as a geographical footprint relative to platform position that encompasses all possible launcher locations for a specific rocket. This is accomplished by creating a sufficient family of backward trajectories from the platform using maximum range equations for ascending or descending profiles based on the rocket's total energy.

These volumes and footprints may be generated from the rocket's final ECEF or ECI energy. Thus, the geometric models are only approximations due to the aforementioned assumptions. A thrusting booster's time of flight from launch to burnout will be underestimated because the actual powered flight segment takes longer than its ballistic representation. The range from launch to burnout will be overestimated because the actual powered flight covers less ground distance than its ballistic representation. This causes the preliminary analysis to be conservative, creating an oversized volume or footprint. While the analysis may be conservative, the results are useful to alert operators of orbiting platforms of the risk posed by rockets launched from earth-based platforms.

Fundamental Ballistic Trajectory Computations

In an embodiment, the necessary parameters, planar angles, and time of flight that define a specific rocket's trajectory are determined using simple two-body orbital dynamics. A rocket's burnout altitude ($alt_{bo}$) and inertial velocity ($V = V_{bo}$) are converted to the burnout position ($r = r_{bo}$) and the rocket's total energy $\xi$ is determined:

$$\xi = \frac{V^2}{2} - \frac{\mu}{r} \quad (1)$$

where $\mu$ is the earth gravitational parameter.

In this embodiment, the trajectory is deemed ballistic from launch with an orbital semi-major axis of $$a = \frac{-\mu}{2 \cdot \xi}. \quad (2)$$

This analysis is only meant for rockets with insufficient energy for gravitational escape, meaning $\xi$ should be negative. If $\xi$ is zero or positive, then the rocket has sufficient energy to access any orbiting satellite.

The launcher's altitude ($alt_{launcher}$) and the satellite platform's altitude ($alt_{sat}$) are converted to earth-centered $r_{launcher}$ and $r_{sat}$. Based on the yet-to-be-determined eccentricity (ecc), the true anomaly of the rocket's trajectory at the launcher is defined as $$v_{launcher} = a\cos\left(\frac{\frac{1 - ecc^2}{r_{launcher}} \cdot a - 1}{ecc}\right) \quad (3)$$

The true anomaly of the rocket's trajectory when it reaches the satellite platform will be $$v_{sat} = a\cos\left(\frac{\frac{1 - ecc^2}{r_{sat}} \cdot a - 1}{ecc}\right) \quad (4)$$

FIG. 1 is a graphical representation illustrating the profile where the access occurs after the rocket's apogee. The descending trajectory shown in FIG. 1 is the all-inclusive trajectory as the rocket must ascend prior to descending. The figure shows true anomaly as the angular distance measured from perigee in either direction and is consistent with the equations that follow. As illustrated in FIG. 1, $\alpha$ is the rocket's earth-centric free-flight range angle from launch to satellite platform, $\beta$ is the platform's off-nadir angle to the launcher, $v_{launcher}$ is the true anomaly of rocket trajectory at the launcher, $v_{sat}$ is the anomaly of rocket trajectory at the target, $r_{launcher}$ is the launcher position, and $r_{sat}$ is the rocket position upon reaching satellite platform.

For this trajectory, the square of the rocket's orbital eccentricity is computed by differentiating the free-flight, angular range ($\alpha$) equation from launcher to satellite platform $$\alpha_{descending} = (\pi - v_{launcher}) + (\pi - v_{sat}) \quad (5)$$

with respect to eccentricity after inserting Equation 3 for $v_{launcher}$ and Equation 4 for $v_{sat}$.

There exists an entire family of orbit trajectories passing through both $r_{launcher}$ and $r_{sat}$ for the prescribed energy. For this embodiment we are interested in the trajectory that produces the maximum value for $\alpha_{descending}$. After some manipulation, the resulting eccentricity that yields this specific trajectory is found to be $$(ecc_{descending})^2 = \frac{2 \cdot r_{launcher} \cdot r_{sat} - 3 \cdot a \cdot r_{sat} + 4 \cdot a^2 - 3 \cdot a \cdot r_{launcher}}{a \cdot (r_{sat} - 4 \cdot a + r_{launcher})} \quad (6)$$

where a is the semi-major axis.

The rocket reaches the satellite's altitude post-apogee as shown in FIG. 1.

Figure 2:
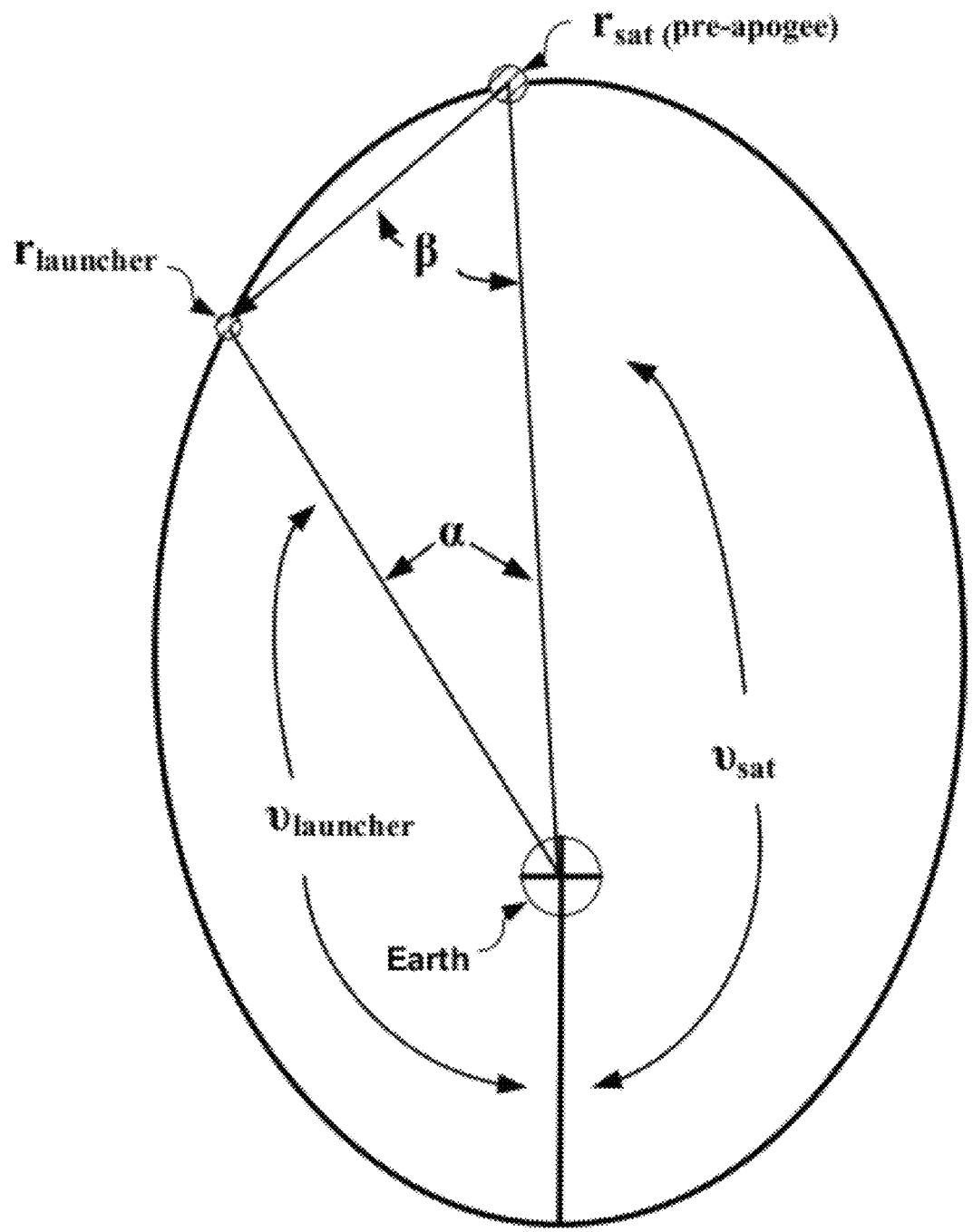
FIG. 2 is a graphical representation illustrating an ascent-only profile where the access occurs at or prior to the rocket's apogee.

FIG. 2 is a graphical representation illustrating an ascent-only profile where the access occurs at or prior to the rocket's apogee. The free-flight, angular range equation is defined as $$\alpha_{ascending} = v_{sat} - v_{launcher} \quad (7)$$

and the associated maximum range occurs when the rocket body reaches the ascending limit (apogee) resulting in $$ecc_{ascending} = \frac{r_{sat}}{a} - 1 \quad (8)$$

A third profile may be determined by coupling $ecc_{descending}$ with $\alpha_{ascending}$ to yield the access solution for the ascending portion of the maximum range trajectory. This result may be used to approximate a quick-ascent trajectory. Such a trajectory could be used for rapid access, thus reducing flight time and diminishing timely detection and response.

It is possible under certain conditions for Equation (6) to produce a negative result, meaning the rocket has enough energy to reach the satellite anywhere in its orbit at the prescribed altitude. For such a case the access region envelops the earth. For visualization purposes the earth-centric free-flight range angle is simply $$\alpha = \pi \quad (9)$$

in all directions.

It is also possible under certain conditions for Equation (6) to produce a result greater than one, meaning the rocket has insufficient energy to reach the satellite. For such a case the access region does not exist.

For all other cases, the distance R from launcher to platform is found from the planar law of cosines $$R = \sqrt{(r_{launcher})^2 + (r_{sat})^2 - 2 \cdot r_{launcher} \cdot r_{sat} \cdot \cos(\alpha)} \quad (10)$$

to produce the platform's off-nadir angle $$\beta = a\sin\left(\frac{r_{launcher} \cdot \sin(\alpha)}{R}\right) \quad (11)$$

The time of flight from launcher to satellite platform is found by differencing the times from perigee-to-launcher and perigee-to-satellite using eccentric anomaly.

$$\sin(E_{launcher}) = \frac{\sin(v_{launcher}) \cdot \sqrt{1 - ecc^2}}{1 + ecc \cdot \cos(v_{launcher})} \quad (12a)$$

$$\cos(E_{launcher}) = \frac{ecc + \cos(v_{launcher})}{1 + ecc \cdot \cos(v_{launcher})} \quad (12b)$$

-continued $$E_{launcher} = a \tan\left(\frac{\sin(E_{launcher})}{\cos(E_{launcher})}\right) \quad (12c)$$

$$TSP_{launcher} = (E_{launcher} - ecc \cdot \sin(E_{launcher})) \cdot \sqrt{\frac{a^3}{\mu}} \quad (12d)$$

$$\sin(E_{sat}) = \frac{\sin(v_{sat}) \cdot \sqrt{1-ecc^2}}{1+ecc \cdot \cos(v_{sat})} \quad (13a)$$

$$\cos(E_{sat}) = \frac{ecc + \cos(v_{sat})}{1+ecc \cdot \cos(v_{sat})} \quad (13b)$$

$$E_{sat} = a \tan\left(\frac{\sin(E_{sat})}{\cos(E_{sat})}\right) \quad (13c)$$

$$TSP_{sat} = (E_{sat} - ecc \cdot \sin(E_{sat})) \cdot \sqrt{\frac{a^3}{\mu}} \quad (13d)$$

Checks must be performed on Equations 12c and 13c to place their respective angles in the proper quadrants. If all trajectories are permissible (descending profile) then the time of flight from launcher to satellite platform becomes $$TOF = 2 \cdot \pi \cdot \sqrt{\frac{a^3}{\mu}} - TSP_{sat} - TSP_{launcher} \quad (14a)$$

else it is $$TOF = TSP_{sat} - TSP_{launcher} \quad (14b)$$

In summary, given $V_{bo}$, $alt_{bo}$, $alt_{launcher}$, $alt_{sat}$, and the desired trajectory profile (descending, ascending, or quick-ascent), the above equations yield the rocket's a, ecc, α, β and TOF in an inertial frame. Because no restriction was placed on $alt_{sat}$ in deriving these equations, they are also valid for non-orbiting platforms. In addition, no lower limit was placed on $V_{bo}$, making these equations valid for slower projectiles such as artillery shells, mortars, and surface-to-air missiles.

Ballistic Representation of Powered Flight

The actual boost phase of a rocket includes mass loss, atmospheric drag, and possibly staging. Given an Earth-Centered, Earth-Fixed (ECEF) ephemeris for this phase, the final two-body orbital energy in this frame is computed from the burnout state. The rocket's powered flight is represented as a ballistic trajectory by matching the burnout conditions and then propagating backwards to the launch altitude to determine an equivalent initial velocity. The rocket is represented as a coasting body by giving it all its burnout energy at launch and then following a simple, planar, ballistic trajectory to the satellite platform, thereby approximating all three phases (boost, coast, and terminal) as one simple exoatmospheric phase.

Figure 3:
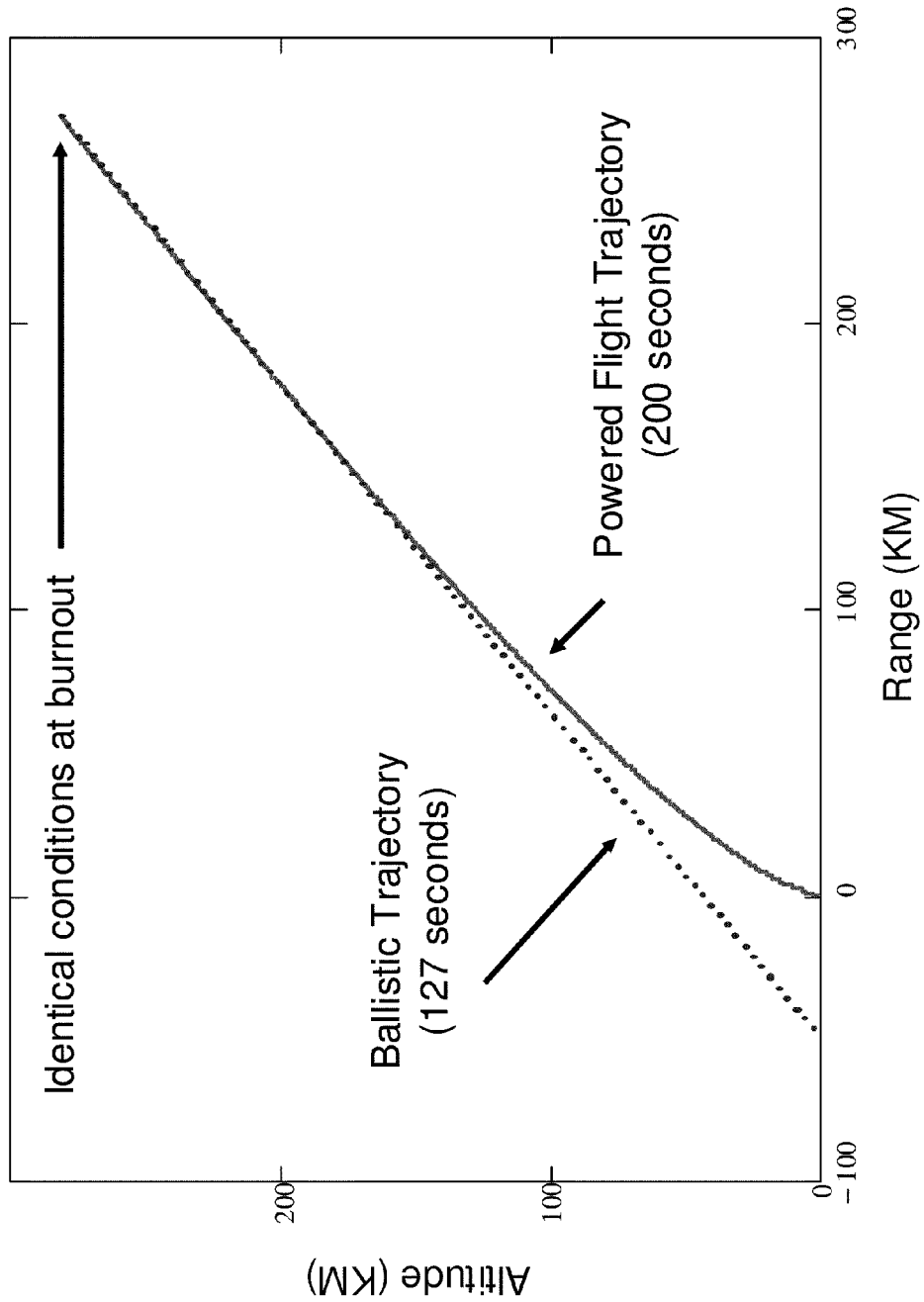
FIG. 3 is a graphical representation illustrating a thrusting trajectory and an exoatmospheric ballistic trajectory of a rocket.

FIG. 3 is a graphical representation illustrating a thrusting trajectory and an exoatmospheric ballistic trajectory of a rocket. The solid line represents a thrusting rocket in a gravity turn and accounts for continuous mass loss as well as drag effects. The dotted line shows an exoatmospheric ballistic trajectory that precisely matches the rocket's burnout altitude, velocity, and flight-path angle. As nominally shown in FIG. 3, the time of flight will be underestimated. Also, the rocket's range from launch to burnout will be overestimated because the actual powered flight covers less ground than its ballistic representation. This causes the preliminary analysis to be conservative, creating an oversized volume or footprint. If a satellite is outside the volume, or a launch platform is outside the footprint, then kinematic access is not possible. If a satellite is inside the volume, or a launch platform is inside the footprint, then further analysis should be considered to refine access feasibility. Because this initial analysis uses a free-flight trajectory representation, the nearer to the boundary of the volume or footprint, the less likely it is that the rocket's true powered-flight trajectory can actually reach the satellite platform. The rocket's thrust profile, dynamic losses, guidance program, launch latitude and azimuth all contribute to defining the access limit, thus requiring more-detailed analysis if inside the volume or footprint.

Determining Equivalent Initial Velocity

This section details how the equivalent, earth-fixed, velocity at launch ($V_m$) may be determined from a rocket's state vector at or after burnout. Given such position ($R_{ECEF\_bo}$) and velocity ($V_{ECEF\_bo}$) vectors in the ECEF frame, the first step is conversion to the ECI frame. By assuming the position vector is at the reference longitude it is not necessary to know the associated time and, therefore, no rotation to the ECI frame is needed, and $R_{ECI}$ is simply set to $R_{ECEF\_bo}$. The ECI burnout velocity becomes:

$$V_{ECI\_bo} = V_{ECEF\_bo} + \begin{pmatrix} 0 \\ 0 \\ \omega_{earth} \end{pmatrix} \times R_{ECEF\_bo} \quad (15)$$

where $\omega_{earth}$ is the earth's rotation rate.

The inertial burnout position and velocity vectors are then propagated backwards in time until reaching the launcher's altitude to determine the ECI launch vectors and ballistic time-of-flight (TOF). With these now known, the rocket's earth-fixed equivalent launch velocity vector can be found from the equations $$\theta = -\omega_{earth} \cdot |TOF| \quad (16)$$

$$V_{ECEF\_launch} = \quad (17)$$
$$\begin{pmatrix} \cos(\theta) & \sin(\theta) & 0 \\ -\sin(\theta) & \cos(\theta) & 0 \\ 0 & 0 & 1 \end{pmatrix} \cdot \left[ V_{ECI\_launch} - \begin{pmatrix} 0 \\ 0 \\ \omega_{earth} \end{pmatrix} \times R_{ECI\_launch} \right]$$

For an earth-fixed launch, Vm is equal to the magnitude of $V_{ECEF\_launch}$ and represents the equivalent of muzzle velocity for the specified rocket. Although this velocity was determined from a single, specific, launch trajectory, returning to an earth-fixed frame allows it to be used for multiple trajectories. Obviously, if the burnout vectors are already given in the ECI frame then the first step in this process is not needed.

Rotating Earth Computations for Kinematic Access Volume

This section shows how to incorporate a rotating earth by iteratively computing the free-flight range angle (α) for a given platform's altitude ($alt_{sat}$) from the rocket's launcher for a family of launch azimuths ($-\pi < AZ_{topocentric} < \pi$). In addition to azimuth, the launcher's latitude ($lat_{launcher}$), altitude ($alt_{launcher}$), and the preferred trajectory (ascending or descending) are acquired. If dealing with a rocket in powered flight then burnout velocity ($V_{bo}$) and altitude ($alt_{bo}$) must also be known and equivalent muzzle velocity determined as detailed in the previous section.

In an embodiment, preliminary values are assigned for the rocket's range (a) and TOF.

If during this iterative process α is zero then the rocket has insufficient energy to reach the satellite.

If α is equal to π then the rocket has enough energy to engage the satellite platform anywhere in its orbit at the prescribed altitude and $$\Delta N = \pi \cdot \text{sign}(AZ_{topocentric}) \quad (18)$$

$$\frac{-\pi}{2} \leq lat_{sat} \leq \frac{\pi}{2} \quad (19)$$

where, $\Delta N$ is the longitudinal offset including earth rotation, $AZ_{inertial}$=inertial launch azimuth and $AZ_{topocentric}$ is the topocentric launch azimuth.

If α is less than π but greater than zero then it is necessary to determine the launch elevation angle ($\phi_{topocentric}$) that maximizes the access range for a given platform's altitude.

For a ground- or sea-based launch the total earth-fixed rocket velocity (Vm) is simply $V_{ECEF\_launch}$.

For an airborne launch Vm is a combination of the rocket's earth-fixed initial velocity and the topocentric velocity of the launch platform ($V_{boost}$) aligned to maximize Vm.

$$Vm = V_{CEF\_launch} + V_{boost} \quad (20)$$

$V_{boost}$ alignment is achieved by having the aircraft perform a pitch-up maneuver along the booster's desired azimuth.

The eastward component of earth-induced velocity (V0) is $$V0 = \cos(lat_{launcher}) \cdot r_{launcher} \cdot \omega_{earth} \quad (21)$$

With Vm and V0 known, a search is performed to maximize the range for the specified azimuth and altitude. For a candidate earth-fixed launch elevation angle ($\phi_{topocentric}$) the magnitude of the rocket's inertial velocity in the topocentric-horizon frame ($V_{sez}$) is computed as $$V_s = -Vm\cos(\phi_{topocentric}) \cdot \cos(AZ_{topocentric}) \quad (22a)$$

$$V_e = Vm\cos(\phi_{topocentric}) \cdot \sin(AZ_{topocentric}) + V0 \quad (22b)$$

$$V_z = Vm\sin(\phi_{topocentric}) \quad (22c)$$

$$V_{se} = \sqrt{(V_s)^2 + (V_e)^2} \quad (22d)$$

$$V_{sez} = \sqrt{(V_s)^2 + (V_e)^2 + (V_z)^2}, \quad (22e)$$

where, $V_e$=east component of rotating earth rocket velocity at launch, $V_s$=south component of rotating earth rocket velocity at launch, $V_z$=up component of rotating earth rocket velocity at launch, and $V_{sez}$=magnitude of rotating earth rocket velocity at launch.

The basic inertial computations set forth above are accomplished with V set to $V_{sez}$, and r set to $r_{launcher}$ to find the values of a, ecc, α, β and TOF. The process is repeated until α reaches its maximum value for the desired azimuth and altitude.

The cosine of the inertial azimuth ($AZ_{inertial}$) becomes $$\cos(AZ_{inertial}) = \frac{-V_s}{V_{se}} \quad (23)$$

Figure 4:
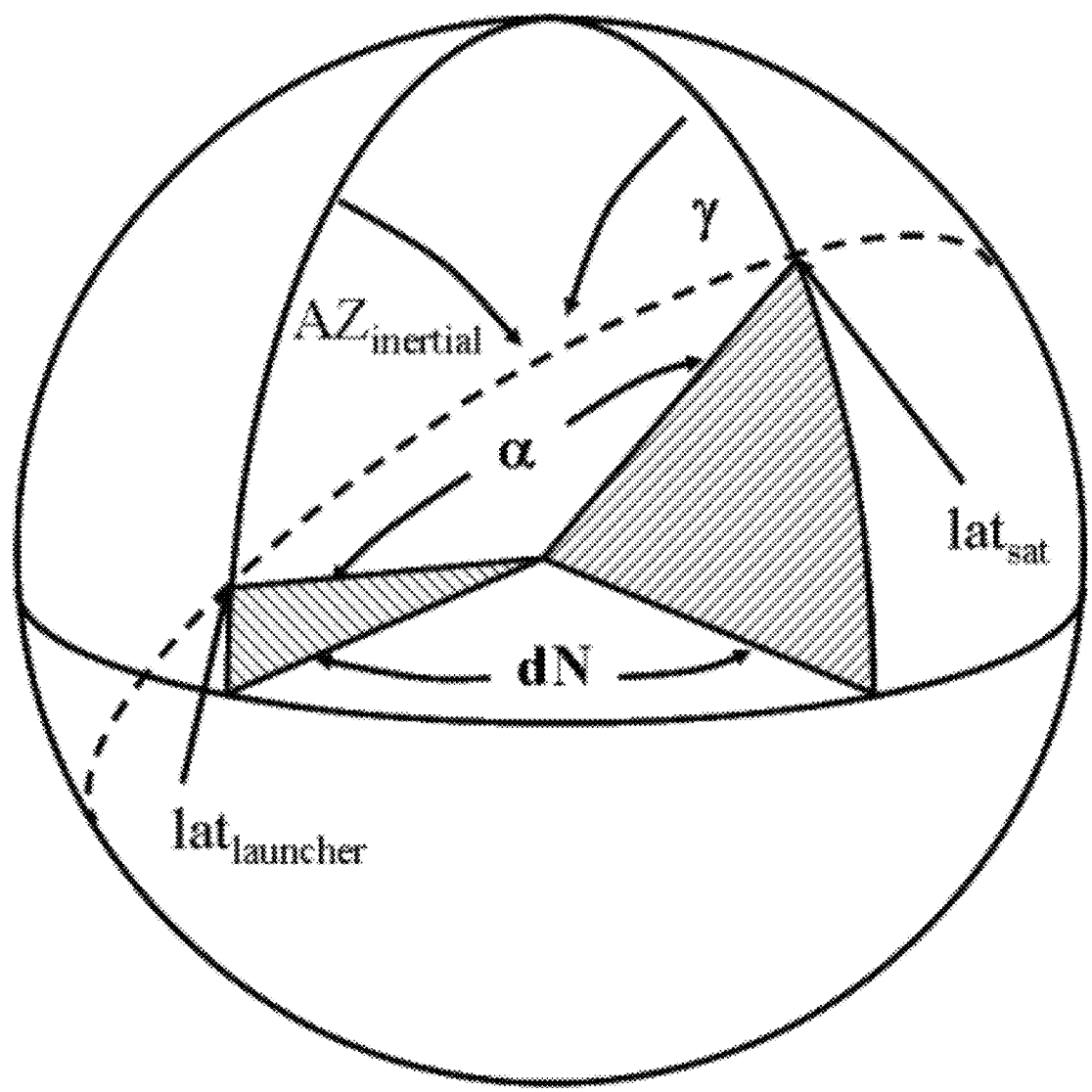
FIG. 4 is a graphical representation illustrating a launcher and a satellite geometry in inertial space.

FIG. 4 is a graphical representation illustrating a launcher and a satellite geometry in inertial space. The access latitude ($lat_{sat}$) is found from spherical trigonometry to be $$lat_{sat} = \frac{\pi}{2} - a\cos\bigl(\cos(lat_{launcher}) \cdot \cos\bigl(\frac{\pi}{2} - \alpha\bigr) \cdot \cos(AZ_{inertial}) + \quad (24)$$
$$\sin(lat_{launcher}) \cdot \sin\bigl(\frac{\pi}{2} - \alpha\bigr)\bigr)$$

The longitudinal offset ($\Delta N$) from the launcher is then computed accounting for the earth rotation rate $\omega_{earth}$ as determined from $$dN = a\cos\left(\frac{\cos(\alpha) - \sin(lat_{sat}) \cdot \sin(lat_{launcher})}{\cos(lat_{sat}) \cdot \cos(lat_{launcher})}\right) \quad (25)$$

$$\Delta N = dN \cdot \text{sign}(V_e) - \omega_{earth} \cdot |TOF| \quad (26)$$

A volume may be inferred that shows all possible platform locations that may be reached by a rocket. To accomplish this, a family of equally spaced launch azimuths is created as well as a family of platform altitudes. The computations described above are accomplished for each azimuth ($AZ_{topocentric}$) at all altitudes ($alt_{sat}$) coupled with the launcher latitude ($lat_{launcher}$) and altitude ($alt_{launcher}$), rocket burnout velocity ($V_{bo}$) and altitude ($alt_{bo}$), and preferred trajectory. The resulting family of points ($\Delta N$, $lat_{sat}$, $alt_{sat}$) define a three-dimensional surface grid of the access volume and may be used to create a convex hull representing the region.

A pre-launch assessment may be done using this access volume to assure orbiting satellite safety. If a particular object is predicted to pass through the volume then an access opportunity exists although the rocket would have been launched much earlier. With the time of flight known, a user could determine if a launch has occurred prior to the platform actually entering the access region. If no such launch has occurred, then unfettered passage through the region is assured. If a launch has been observed or is planned, then there may be sufficient time to prepare for the access or to avert it.

Figure 5A:
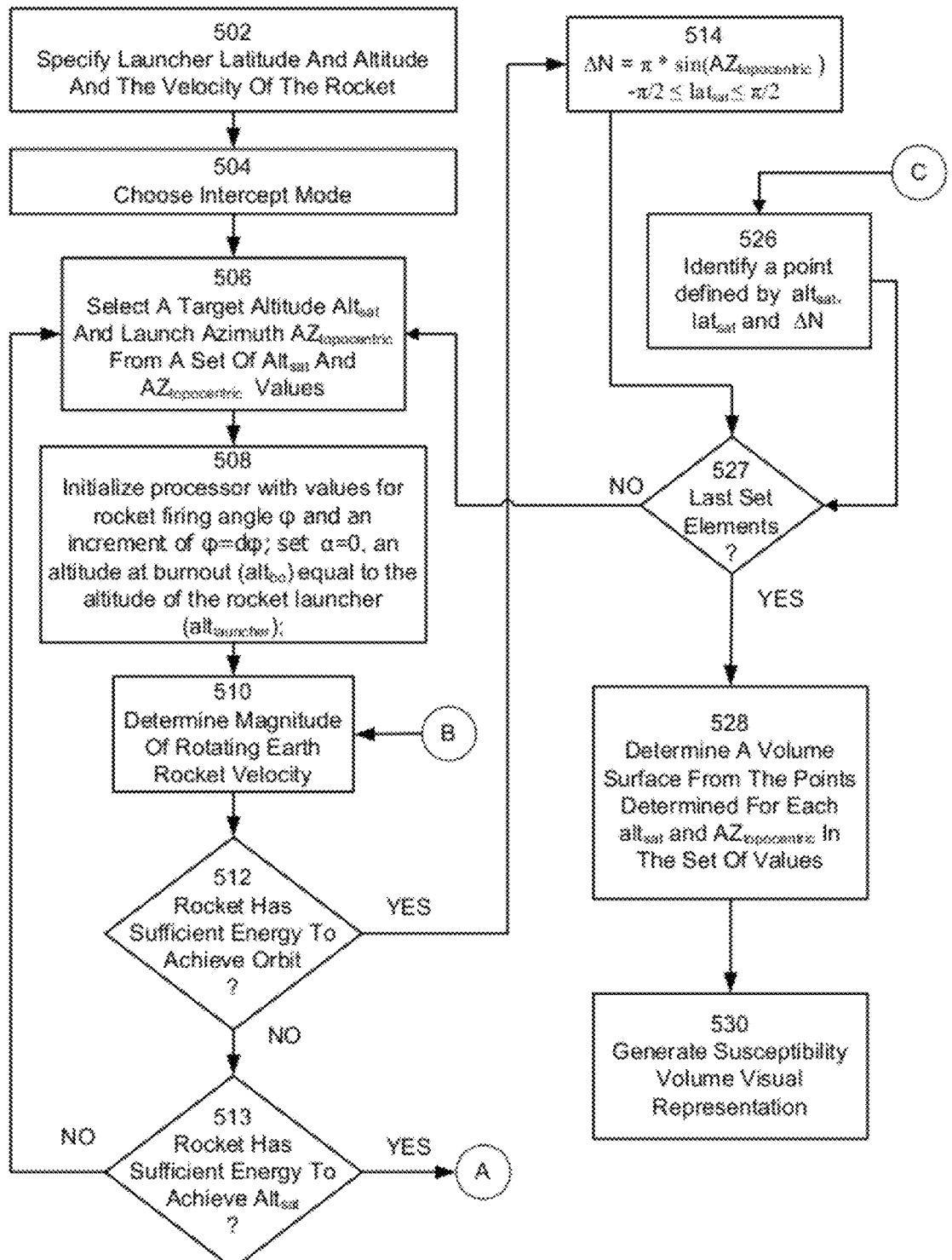
FIGS. 5A and 5B are flow diagrams illustrating a process of establishing susceptibility volume for a target according to an embodiment.
Figure 5B:
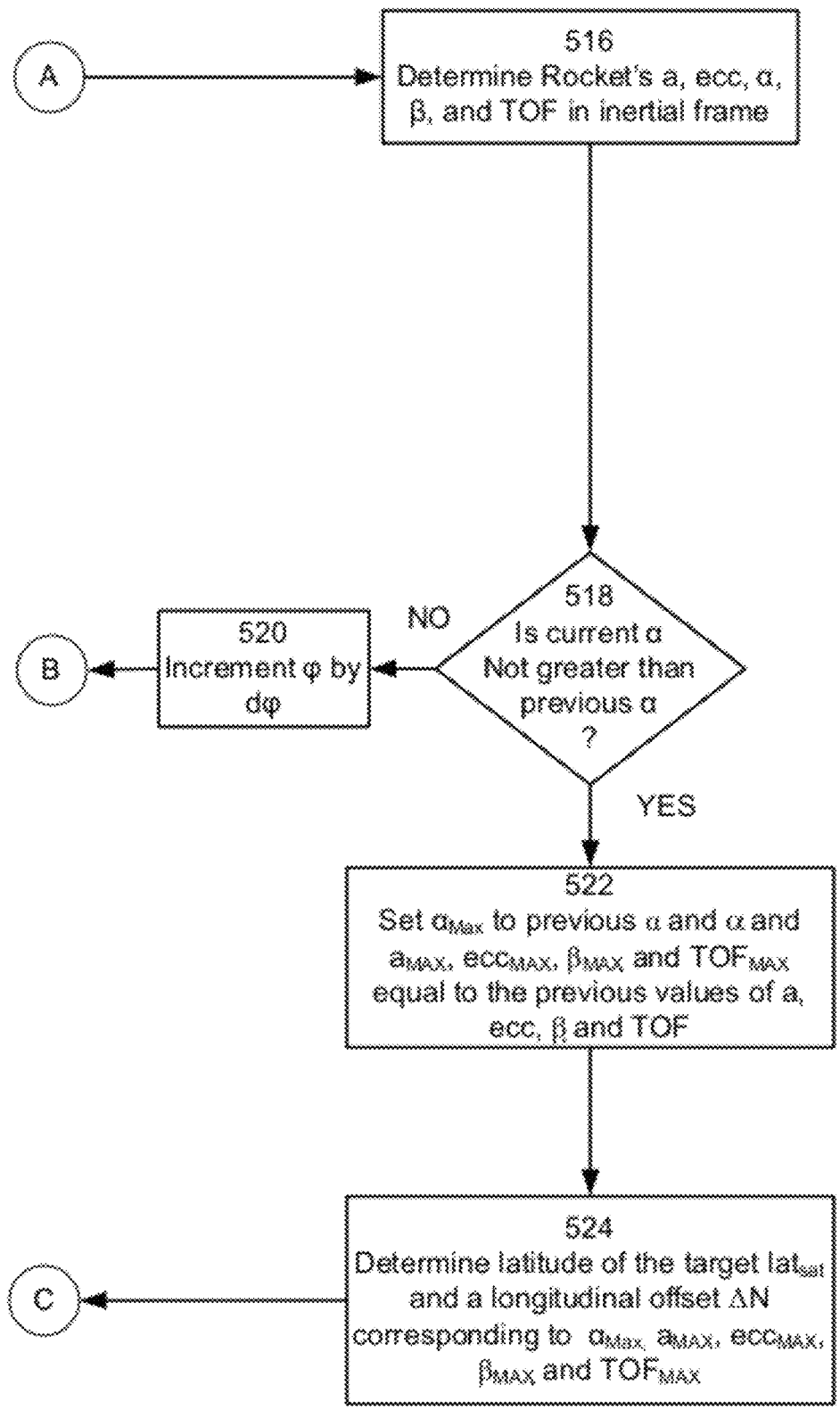

FIGS. 5A and 5B are flow diagrams illustrating a process of establishing susceptibility volume for a target according to an embodiment.

A latitude and altitude of a launcher from which the rocket will be launched and a velocity of a rocket are specified. (FIG. 5A, Block 502.) The desired intercept mode (ascending, descending, or rapid-ascent) is specified. (FIG. 5A, Block 504.) A target altitude ($alt_{sat}$) and a topocentric firing azimuth ($AZ_{topocentric}$) are selected from a set of desired target altitudes and topocentric firing azimuths. (FIG. 5A, Block 506.) A first processor is initialized with values for a launcher firing angle relative to a horizon ($\phi$), wherein $\phi$ is small and positive, an increment of $\phi$($d\phi$), a range of the rocket ($\alpha$) equal to zero, and an altitude at burnout ($alt_{bo}$) equal to the altitude of the rocket launcher ($alt_{launcher}$). (FIG. 5A, Block 508.)

For each desired target altitude ($alt_{sat}$) and topocentric firing azimuth ($AZ_{topocentric}$) an iterative process is used to determine a maximum range α of the rocket. The first processor determines a magnitude of a rotating earth rocket velocity ($V_{sez}$) using Equations 21 and 22. Equations 1-6 are then evaluated using $V=V_{sez}$. (FIG. 5A, Block 510.)

A determination is made whether rocket has sufficient energy to reach orbit. (FIG. 5A, Block 512.) This determination is based on the results of Equation 6. If the right side of Equation 6 is negative, the rocket has sufficient energy to reach orbit. Under these circumstances, the condition of Block 512 (FIG. 5A) is met (that is, the result of FIG. 5A, Block 512 is "YES") and the process continues at Block 514

(FIG. 5A) where equations 18 and 19 are evaluated. The process continues at Block 527 (FIG. 5A) as described below.

If the right side of Equation 6 is not negative, then the rocket does not have sufficient energy to reach orbit and the condition of Block 512 (FIG. 5A) is not met (that is, the result of FIG. 5A, Block 512 is "NO"). A determination is made whether rocket has sufficient energy to reach $alt_{sat}$. (FIG. 5A, Block 513.) This determination is based on the results of Equation 6. If the right side of Equation 6 is greater than one, then the rocket does not have sufficient energy to reach $alt_{sat}$ (that is, the result of FIG. 5A, Block 513 is "No"). In this case, the process returns to Block 506 (FIG. 5A), If the right side of Equation 6 is between zero and one, then condition of Block 513 (FIG. 5A) is met (that is, the result of FIG. 5A, Block 512 is "YES"), the first processor determines a value of $\alpha$ and an eccentricity (ecc). (FIG. 5B, Block 514). In an embodiment, if the intercept mode is a descending trajectory, the first processor uses Equations 5 and 6 to determine a value of $\alpha$ and ecc. In another embodiment, if the intercept mode is an ascending trajectory, the first processor uses Equations 7 and 8 to determine a value of $\alpha$ and ecc.

The first processor determines the rocket's a, ecc, $\alpha$, $\beta$, and TOF in an inertial frame, wherein a is the semi-major axis, $\beta$ is a target's off-nadir angle to the rocket launcher, and TOF is a time of flight of the rocket from the rocket launcher to the target. (FIG. 5B, Block 516.) In an embodiment, the rocket's a, ecc, $\alpha$, $\beta$, and TOF in an inertial frame are determined using Equations 10-14.

The first processor determines whether a current value of $\alpha$ is greater than the previously determined value of $\alpha$ (FIG. 5B, Block 518). When the current value of $\alpha$ is greater than the previously determined value of $\alpha$, the condition of Block 518 (FIG. 5B) is not met (that is, the result of FIG. 5B, Block 518 is "NO") then the first processor increments $\phi$ by $d\phi$ to determine a next value of $\alpha$ (FIG. 5B, Block 520) and the iterative process continues at block 510 (FIG. 5A). When the current value of $\alpha$ is less than or equal to the previously determined value of $\alpha$, the condition of Block 518 is met (that is, the result of FIG. 5B, Block 518 is "YES"), the first processor sets $\alpha_{MAX}$ equal to the previous value of $\alpha$ and $a_{MAX}$, $ecc_{MAX}$, $\beta_{MAX}$, and $TOF_{MAX}$ equal to the previous values of a, ecc, $\beta$, and TOF. (FIG. 5B, Block 522).

For each desired target altitude ($alt_{sat}$) and topocentric $\phi$iring azimuth ($AZ_{topocentric}$), a second processor determines a latitude of the satellite $lat_{sat}$ and a longitudinal offset ($\Delta N$) corresponding to $\alpha_{MAX}$, $a_{MAX}$, $ecc_{MAX}$, $\beta_{MAX}$, and $TOF_{MAX}$. (FIG. 5B, Block 524). The second processor identifies a point defined by $alt_{sat}$, $lat_{sat}$, and $\Delta N$ in an inertial frame relative to a launcher location. (FIG. 5A, Block 526.)

The second processor determines whether all of the values in the set of desired target altitudes and topocentric firing azimuths have been evaluated. (FIG. 5A, Block 527). When the values in the set of desired target altitudes and topocentric firing azimuths have not been evaluated, the condition of Block 527 (FIG. 5A) is not met (that is, the result of FIG. 5A, Block 527 is "NO") then the process returns to Block 506 (FIG. 5A). When the values in the set of desired target altitudes and topocentric firing azimuths have been evaluated, the condition of Block 527 (FIG. 5A) is met (that is, the result of FIG. 5A, Block 527 is "YES") then the process continues at Block 528 (FIG. 5A).

The second processor defines a volume surface from the points determined for each $alt_{sat}$ and $AZ_{topocentric}$ in the set of desired target altitudes and topocentric firing azimuths. (FIG. 5A, Block 528.)

A third processor receives the volume surface points from the second processor generates a visual representation of an access volume. (FIG. 5A, Block 530.)

Rotating Earth Computations for Kinematic Access Footprint

A terrestrial footprint may be created that shows launcher geographical locations that could access the platform in its current position. To accomplish this, equally spaced, platform-centric, arrival azimuths ($\gamma$) are created. Each arrival azimuth ($\gamma$) is coupled with the platform latitude ($lat_{sat}$) and altitude ($alt_{sat}$), burnout velocity ($V_{bo}$) and altitude ($alt_{bo}$), and preferred trajectory. Backwards propagation determines latitudinal and longitudinal displacement from the platform sub-point through an iterative process. Based on an approximation of rocket energy, the rocket's orbit is propagated backwards from the platform to find the launcher's latitude. This latitude determines the rotating earth's contribution to velocity and is used to refine the rocket's total inertial energy. The process is then repeated with the refined energy, causing a shift in latitude until convergence.

In an embodiment, basic inertial computations are performed as previously described and preliminary values for the rocket's a, ecc, $\alpha$, $\beta$ and TOF are determined. If during this iterative process $\alpha$ is zero then the rocket has insufficient energy to reach the satellite. If $\alpha$ is equal to $\pi$ then the rocket has enough energy to intercept the satellite anywhere in its orbit at the prescribed altitude and $$\Delta N = \pi \cdot \text{sign}(\gamma) \tag{27}$$

$$\frac{-\pi}{2} \leq lat_{launcher} \leq \frac{\pi}{2} \tag{28}$$

If $\alpha$ is less than $\pi$ but greater than zero then iteration is required to assess the trajectory that results from a rotating earth. The earth-fixed ballistic velocity (Vm) is defined by Equation 20 and the rotating earth rocket velocity ($V_{sez}$) is initialized to this value.

The basic inertial computations are accomplished with V set to $V_{sez}$, and r set to $r_{launcher}$ to produce intermediate values for a, ecc, $\alpha$, $\beta$ and TOF. The angular momentum h is determined from $$h = \sqrt{|a \cdot (1-ecc^2) \cdot \mu|} \tag{29}$$

and the inertial launch elevation angle $\phi_{inertial}$ is found from $$\phi_{inertial} = a\cos\left(\frac{h}{r_{launcher} \cdot V_{sez}}\right) \tag{30}$$

The launcher latitude ($lat_{launcher}$) is depicted in FIG. 4 and is determined from the spherical law of cosines as $$lat_{launcher} = \frac{\pi}{2} - a\cos(\cos(\alpha) \cdot \sin(lat_{sat}) + \sin(\alpha) \cdot \cos(lat_{sat}) \cdot \cos(\gamma)) \tag{31}$$

Based on the new launcher latitude, the inertial launch azimuth ($AZ_{inertial}$) is computed as $$AZ_{inertial} = -\text{sign}(\gamma) \cdot a\cos\left(\frac{\sin(lat_{sat}) - \sin(lat_{launcher}) \cdot \cos(\alpha)}{\cos(lat_{launcher}) \cdot \sin(\alpha)}\right) \tag{32}$$

The components of the rotating earth ballistic velocity ($V_{sez}$) are:

$$V_s = -V_{sez} \cdot \cos(\phi_{inertial}) \cdot \cos(AZ_{inertial}) \quad (33a)$$

$$V_e = V_{sez} \cdot \cos(\phi_{inertial}) \cdot \sin(AZ_{inertial}) \quad (33b)$$

$$V_z = V_{sez} \cdot \sin(\phi_{inertial}) \quad (33c)$$

The refined eastward component of earth-induced velocity (V0) becomes $$V0 = \cos(lat_{launcher}) \cdot r_{launcher} \cdot \omega_{earth} \quad (34)$$

The topocentric launch azimuth and elevation angles to achieve the above are $$\sin(AZ_{topocentric}) = \frac{(Ve - V0)}{\sqrt{Vs^2 + (Ve - V0)^2 + Vz^2}} \quad (35a)$$

$$\cos(AZ_{topocentric}) = \frac{-Vs}{\sqrt{Vs^2 + (Ve - V0)^2 + Vz^2}} \quad (35b)$$

$$\phi_{topocentric} = a\tan\left[\frac{Vz}{\sqrt{Vs^2 + (Ve - V0)^2}}\right] \quad (36)$$

The eastward component of earth-induced velocity from Equation 34 and the topocentric angles from Equations 35 and 36 can now be used with Vm to refine the estimate of $V_{sez}$ through Equation 22. The process is repeated with this new $V_{sez}$ until it converges.

Longitudinal offset (ΔN) is then computed using spherical trigonometry and the earth rotation rate $\omega_{earth}$ $$dN = a\cos\left(\frac{\cos(\alpha) - \sin(lat_{sat}) \cdot \sin(lat_{launcher})}{\cos(lat_{sat}) \cdot \cos(lat_{launcher})}\right) \quad (37)$$

$$\Delta N = -dN \cdot \text{sign}(AZ_{inertial}) + \omega_{earth} \cdot |TOF| \quad (38)$$

The resulting family of points on the earth's surface (ΔN, $lat_{launcher}$) may be plotted to show the footprint beneath an airborne or orbiting platform. It is important to note that this footprint has accounted for the earth rotation as well as the rocket's time of flight. The points represent the current location of possible launchers although the rocket was launched before the platform arrived at its present position.

Figure 6:
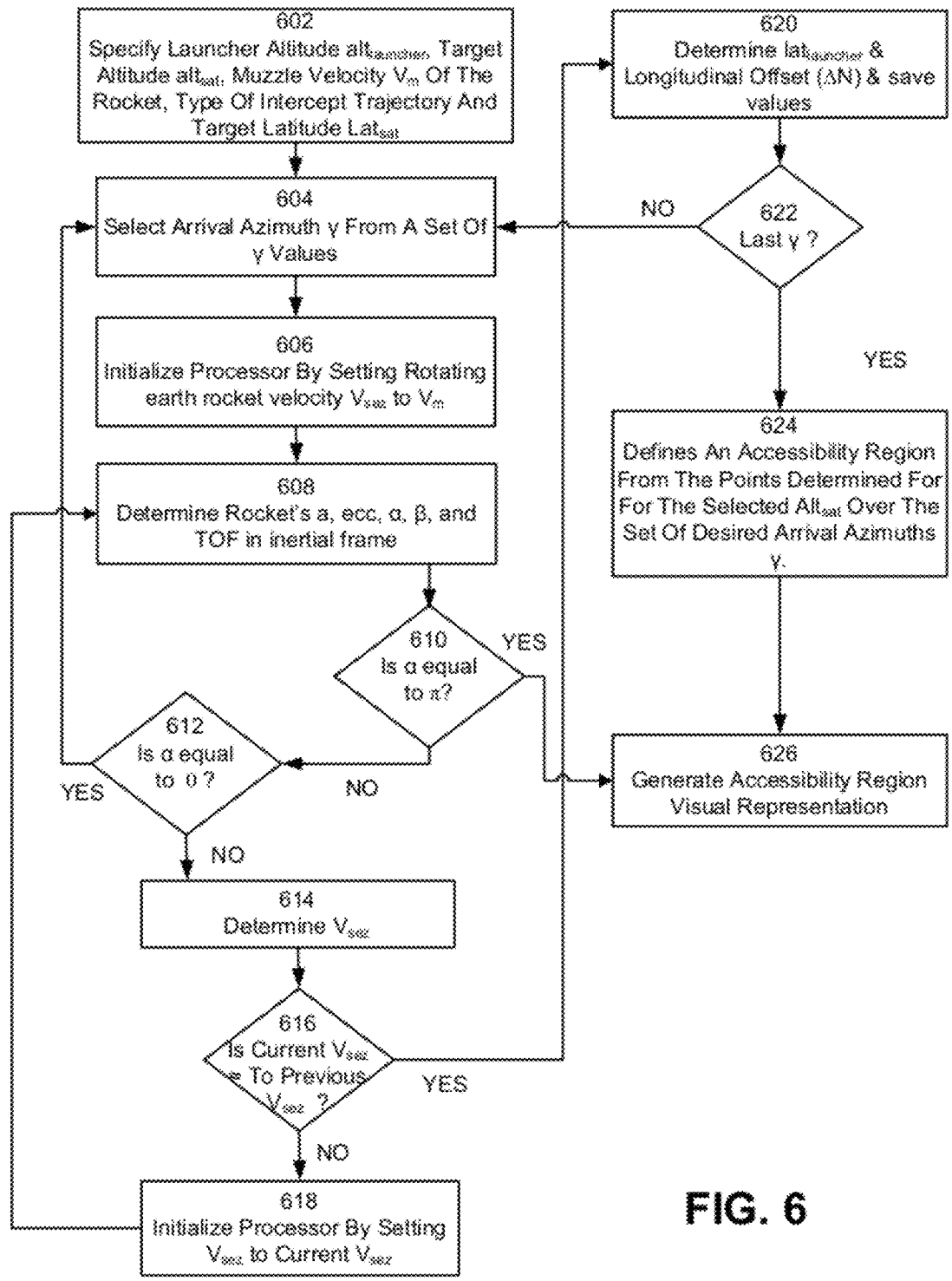
FIG. 6 is a flow diagram illustrating a process of establishing susceptibility footprint for a target according to an embodiment.

FIG. 6 is a flow diagram illustrating a process of establishing susceptibility volume for a target according to an embodiment.

A muzzle velocity $V_m$ of a rocket, an altitude of the rocket launcher ($alt_{launcher}$) from which the rocket will be launched, the type of intercept trajectory, and the target's altitude $alt_{sm}$ and latitude $lat_{sm}$ are specified. (Block 602.) A desired arrival azimuth of a rocket γ is selected from a set of desired arrival azimuths. (Block 604.) A first processor is initialized by setting a value for a rotating earth rocket velocity ($V_{sez}$) to $V_m$. (Block 606.)

For each desired arrival azimuth of a rocket γ at the specified target altitude an iterative process is used to a converging value of $V_{sez}$. The first processor determines the rocket's a, ecc, α, β, and TOF in an inertial frame using equations 1-14. (Block 608.)

A determination is made whether the current value α is equal to π (Block 610). If α is equal to π (that is, the result of Block 610 is "Yes") then the rocket has enough energy to reach the target from any launcher location and the accessibility footprint is the whole earth. The process continues at Block 626 as described below.

If α is not equal to π (that is, the result of Block 610 is "No"), then a determination is made whether α is equal to 0 (Block 612). If α is equal to 0 (that is, the result of Block 612 is "Yes") then the rocket cannot reach the selected altitude of the target with that arrival azimuth. The process returns to Block 604.

If the current α is not equal to 0, the condition of Block 612 is not met (that is, the result of Block 612 is "NO") the process continues at Block 614 where a value of $V_{sez}$ is determined using Equations 30-36.

A determination is made whether the current value of $V_{sez}$ is approximately equal to a just previous value of $V_{sez}$. (Block 616.) When the current value of $V_{sez}$ is not approximately equal to a just previous value of $V_{sez}$ then condition of Block 616 is not met (that is, the result of Block 616 is "NO"), the first processor is initialized with the current value of $V_{sez}$ (Block 618) and process returns to Block 608. When the current value of $V_{sez}$ is approximately equal to a just previous value of $V_{sez}$ then condition of Block 616 is met (that is, the result of Block 616 is "YES"), $lat_{launcher}$ and longitudinal offset (ΔN) are determined using Equations 31, 37, and 38 and the values are saved. (Block 620.)

A determination is made whether the set of arrival azimuth of a rocket γ has been evaluated. (Block 622.) If the last γ of the set of arrival azimuths has not been evaluated, (that is, the result of Block 622 is "NO"), the process returns to Block 604 where the next γ is selected. If the last γ of the set of arrival azimuths has been evaluated, (that is, the result of Block 621 is "YES"), the process continues with Block 624.

A second processor defines an accessibility region from the points determined for the selected $alt_{sat}$ over the set of desired arrival azimuths γ. (Block 624.) A third processor receives the accessibility region points from the second processor and generates a visual representation of an accessibility region. (Block 626.)

Figure 7:
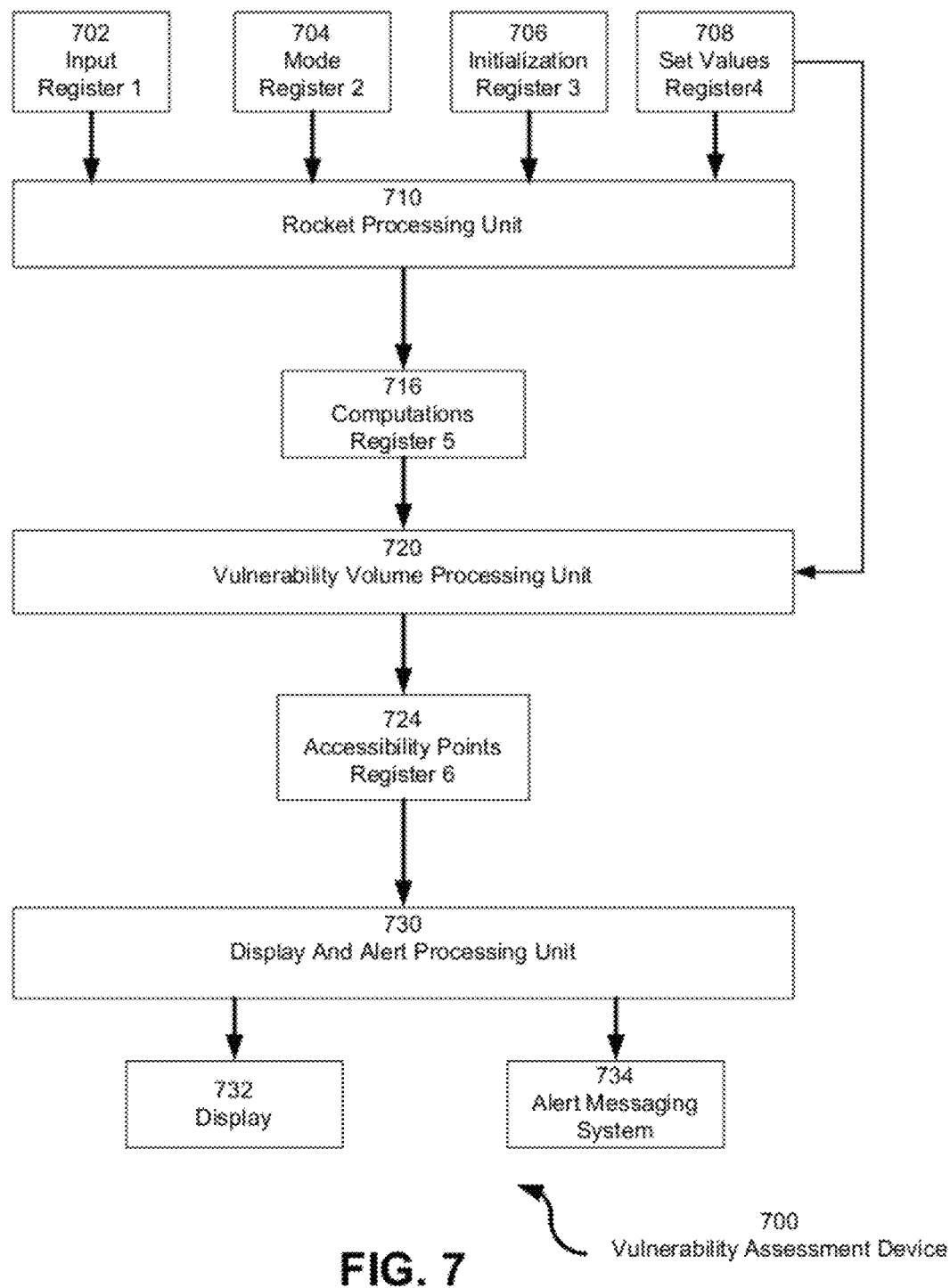
FIG. 7 is a block diagram illustrating an accessibility assessment device according to an embodiment.

FIG. 7 is a block diagram illustrating an accessibility assessment device according to an embodiment. The accessibility assessment device 700 may be configured to determine an access volume (see, FIG. 5) and to determine an access region (see, FIG. 6).

In an embodiment, an accessibility assessment device 700 comprises rocket processing unit 710, an access volume processing unit 720, a display and alert processing unit 730 and a display device 732.

When configured for determining an access volume, the rocket processing unit 710 receives rocket velocity and launcher latitude and altitude data from an input data register 1 702, a selected intercept mode from a mode data register 2 704, and a set of desired target altitudes and topocentric firing azimuths from a set data register 4 708. The rocket processing unit is initialized with values for a launcher firing angle relative to a horizon (φ), wherein φ is small and positive, an increment of φ(dφ), a range of the rocket (cc) equal to zero, and an altitude at burnout ($alt_{bo}$) equal to the altitude of the rocket launcher ($alt_{launcher}$) from an initialization data register 3 708. The rocket processing unit 710 performs rotating earth computations for the rocket for each desired target altitude and topocentric firing azimuth in the set of desired target altitudes and topocentric firing azimuths and stores the results of these computations in the computations register 5 716.

The accessibility processing unit 720 receives the rotating earth computations for the rocket from the register 716. The accessibility processing unit 720 applies these data to determine a point on a surface for each desired target altitude and topocentric firing azimuth in the set of desired target altitudes and topocentric firing azimuths and stores these points in an accessibility points data register 6 724.

The display and alert processing unit 730 receives the surface point data from the accessibility points data register 6 724 and produces a visual representation of an access volume on a display device 732. In another embodiment, the display and alert processor 730 issues an alert via an alert messaging system 734. In an embodiment, the alert messaging system may provide an alert on the display device 732. In another embodiment, the alert messaging system may communicate the alert via a text message or audio signal via a wired or wireless network (not illustrated).

When configured for determining an access region, the rocket processing unit 710 receives rocket $V_m$ of a rocket, an altitude of the rocket launcher ($alt_{launcher}$) from which the rocket will be launched, and a target altitude $alt_{sat}$ and latitude $lat_{sat}$ from the input data register 702, a selected intercept mode from the mode data register 704, and a set of desired arrival azimuths of a rocket $\gamma$ is from a data register 707. The rocket processing unit is initialized with a rotating earth rocket velocity ($V_{sez}$) to $V_m$. For each $\gamma$, the rocket processing unit 710 determines a $lat_{launcher}$ and longitudinal offset ($\Delta N$) and stores these results in computations register 5 716.

The accessibility processing unit 720 receives the $lat_{launcher}$ and longitudinal offset ($\Delta N$) for the set of desired arrival azimuths of a rocket $\gamma$ from the register 716. The accessibility processing unit 720 applies these data to determine an accessibility region from the points determined for the selected $alt_{sat}$ and $lat_{sat}$ over the set of desired arrival azimuths $\gamma$ and stores these points in the accessibility points data register 724.

The display and alert processing unit 730 receives the accessibility points data from the register 724 and produces a visual representation of an access region on a display device 732. In another embodiment, the display and alert processor 730 issues an alert via an alert messaging system 734. In an embodiment, the alert messaging system may provide an alert on the display device 732. In another embodiment, the alert messaging system may communicate the alert via a text message or audio signal via a wired or wireless network (not illustrated).

EXAMPLE

This example determines the access volume and footprint for a ground-launched rocket.

Figure 8:
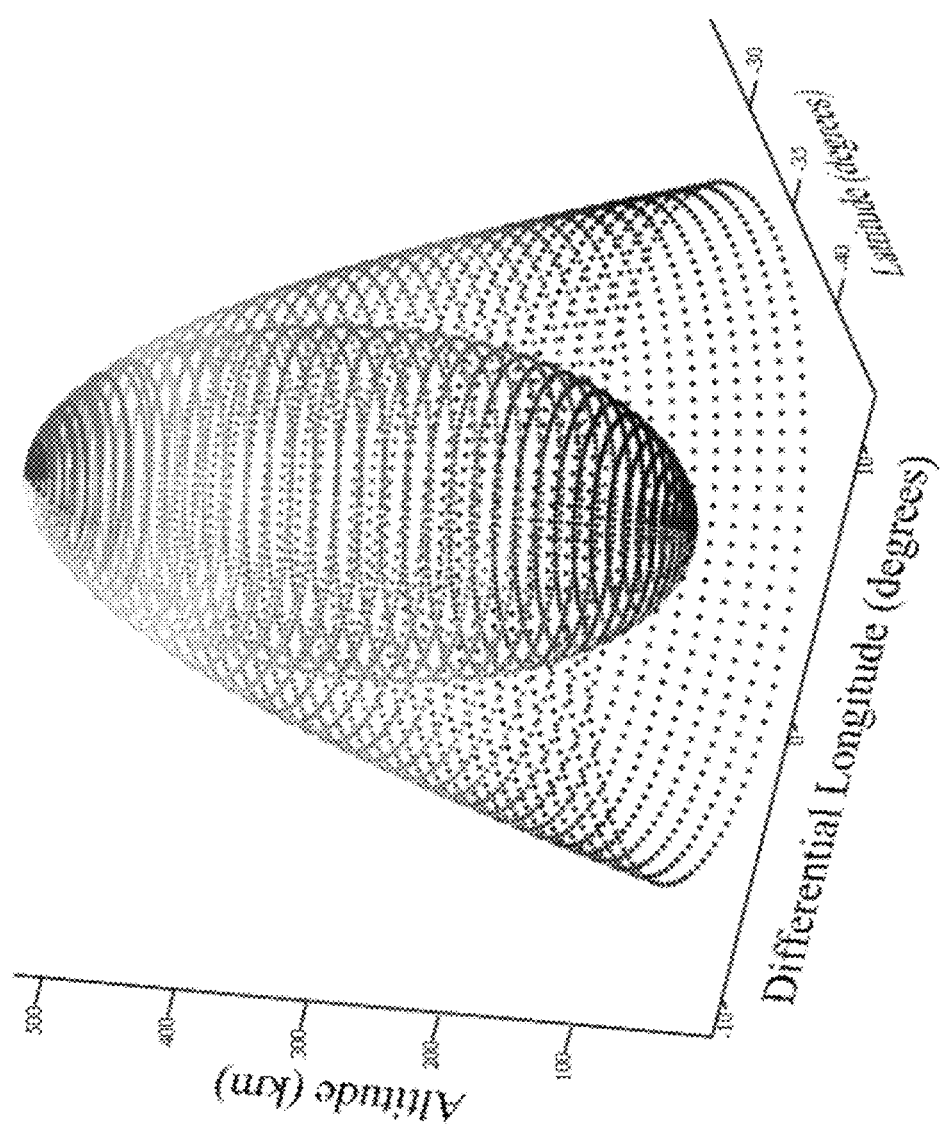
FIG. 8 is a graphical representation illustrating ascending and descending access volumes according to an embodiment.

The earth-fixed rocket (muzzle) velocity Vm from a launch ephemeris or profile are acquired. The entire ephemeris is not needed, only the state vectors and times at launch and burnout in the ECEF (or ECI) frame. For the following arbitrary conditions of a ground-based launch $$R_{ECEF\_launch} = \begin{pmatrix} 3.358348733 \times 10^3 \\ 4.002324168 \times 10^3 \\ 3.658348517 \times 10^3 \end{pmatrix} \cdot km \tag{38a}$$

$$R_{ECEF\_burnout} = \begin{pmatrix} 3.368166448 \times 10^3 \\ 4.074471725 \times 10^3 \\ 3.718730716 \times 10^3 \end{pmatrix} \cdot km \tag{38b}$$

$$V_{ECEF\_burnout} = \begin{pmatrix} 0.054871826 \\ 2.092102911 \\ 1.725722584 \end{pmatrix} \cdot \frac{km}{sec} \tag{38c}$$

and a powered-flight time of 100 seconds, using Equations 15-17 the computed velocity Vm is 3 km/sec. This velocity now characterizes the capability of this particular rocket and may be applied to any terrestrial launch location. Repeatedly applying the equations as detailed in the section ROTATING EARTH COMPUTATIONS FOR KINEMATIC ACCESS VOLUME to a ground-based launcher at 35° S latitude for differing azimuths and elevations produces the following figures:

In FIG. 8 the outer shell defines the kinematic access volume for a descending trajectory and the inner shell shows the access for an ascent-only trajectory. Because this volume is fixed to the launcher and rotates with the earth, it need only be computed once. Should a launch be scheduled within a window of time, a pre-launch assessment may be done using this volume to assure orbiting satellite safety. If a satellite is predicted to pass through the access volume then the launch should be blocked for that brief time interval within its original mission window. The descending trajectory volume also shows the rocket's access all the way to the ground should the user wish to know what geographical regions might be exposed to falling debris from staging or an in-flight abort.

Figure 9:
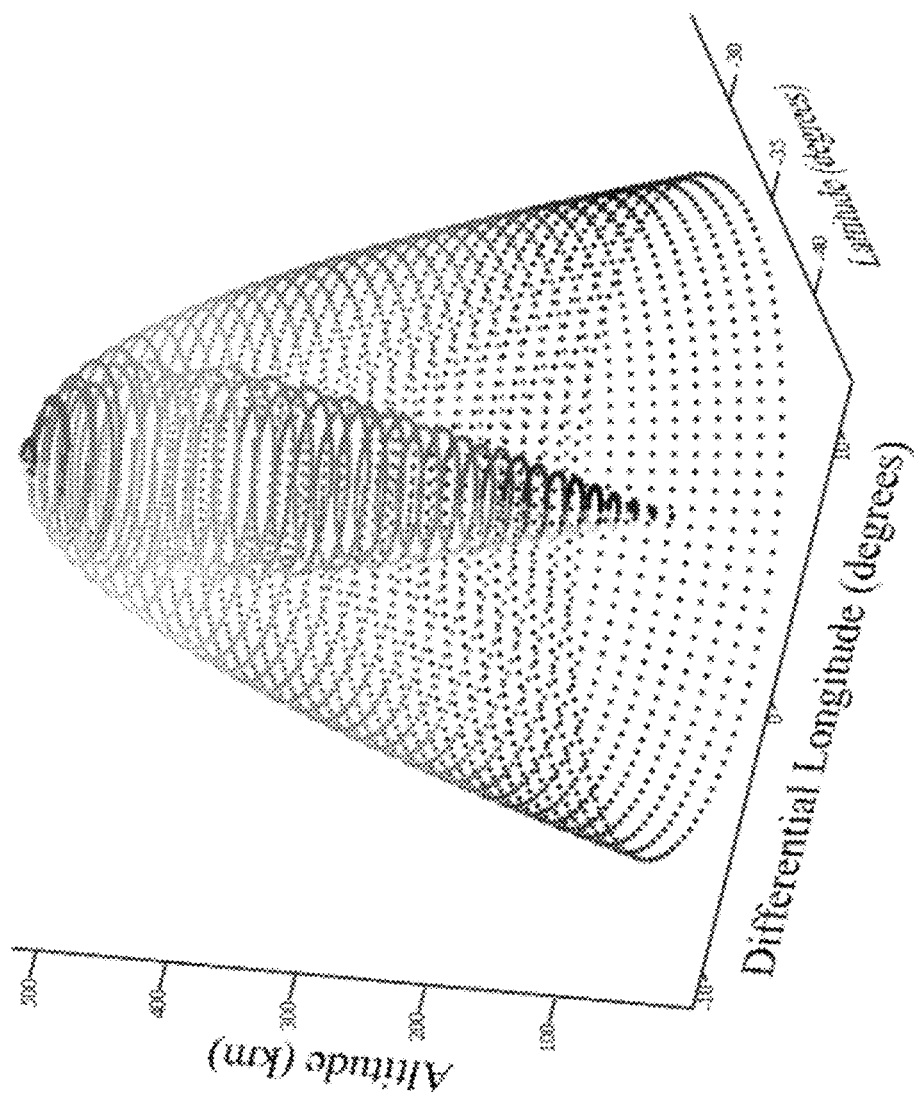
FIG. 9 is a graphical representation illustrating quick-ascent and descending access volumes according to an embodiment.

In FIG. 9 the outer shell defines the access volume for a descending conjunction and the inner shell shows the accessibility with respect to the ascending portion of the same trajectory. This inner volume represents a quick-ascent trajectory, one in which the flight time is short and timely access detection diminished.

Figure 10:
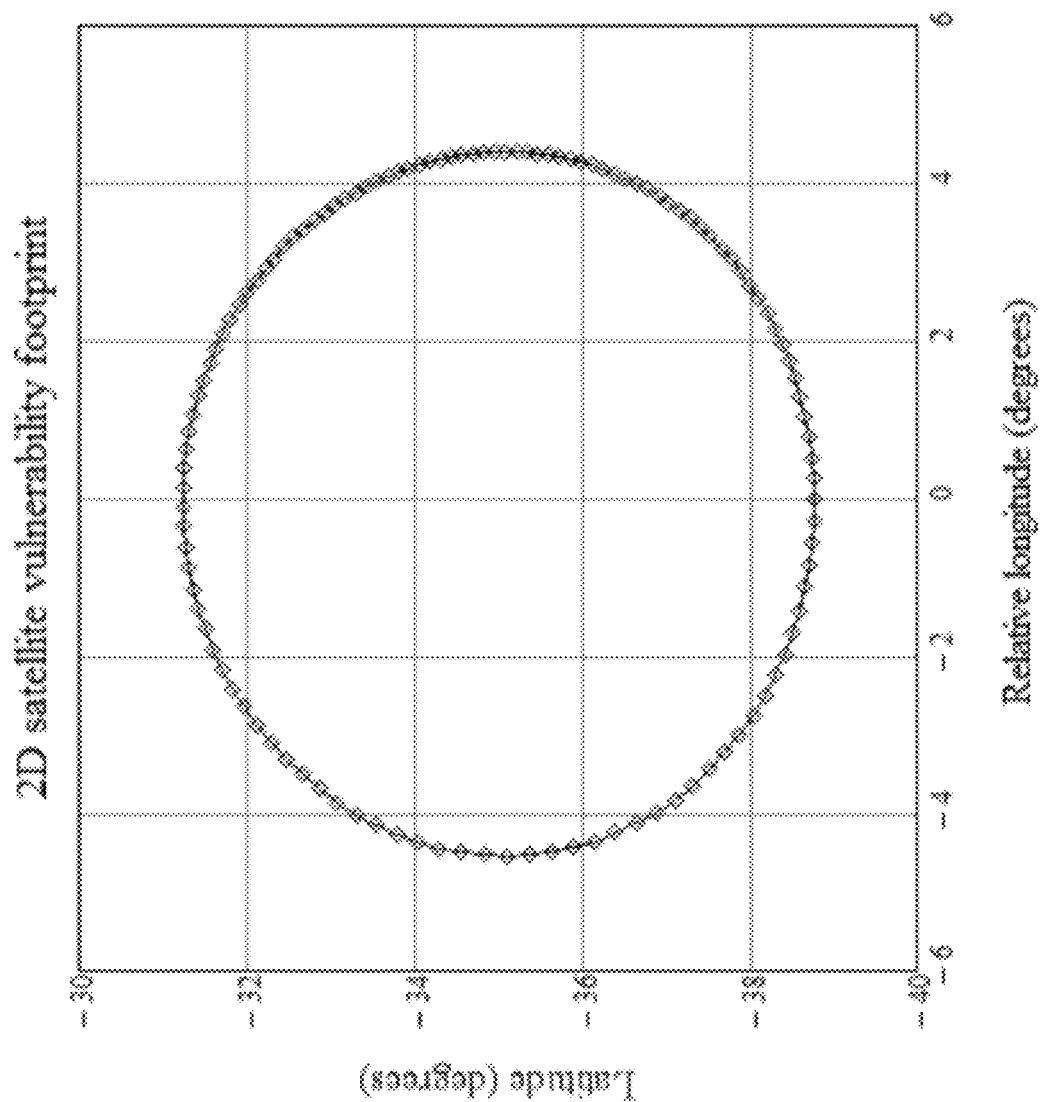
FIG. 10 is a graphical representation illustrating a geographical footprint of launcher locations relative to satellite position according to an embodiment.

Repeatedly applying the equations as detailed in the section ROTATING EARTH COMPUTATIONS FOR KINEMATIC ACCESS FOOTPRINT to a satellite with a sub-latitude of 35° S and altitude of 400 KM for differing arrival azimuths produces an accessibility region as illustrated in FIG. 10.

FIG. 10 illustrates the geographical footprint relative to satellite position that encompasses all possible launcher locations for a specific rocket on the all-inclusive descending trajectory. Because the footprint varies with satellite altitude and latitude, it must continually be refreshed over time.

Simple two-body orbital dynamics were used to initially determine the kinematic access for a ballistic vehicle. This access was represented in two ways: as a volume relative to its launcher and also as a geographical footprint relative to an airborne or satellite platform position that encompassed all possible launcher locations. This approach assumed a ballistic trajectory from launch by working backwards from a rocket's burnout state. Three access solutions were found that account for spherical earth rotation. The first solution found the maximum range for an ascent-only trajectory while the second accommodated a descending trajectory. The third solution used the ascending portion of the descending trajectory to depict a rapid access scenario. All three solutions were formulated to address ground-, sea-, or air-launched boosters. A pre-launch assessment may be done using the access volume to assure orbiting satellite safety. With the time of flight known, a user could also determine if a rocket launch has occurred prior to the satellite entering the accessible region. If no such launch has occurred, then unfettered passage through the region is assured. If a launch has been observed, then the user may have time to react to an unscheduled access. A more accurate assessment would require a precise rocket fly-out profile tailored to a specific mission.

Because no restriction was placed on $alt_{sat}$ in deriving these equations, they are also valid for non-orbiting platforms. In addition, no lower limit was placed on $V_{bo}$, making these equations valid for slower projectiles such as artillery shells, mortars, and surface-to-air missiles. For powered flight the volume or footprint will be oversized because the actual flight path covers less ground distance than its ballistic representation.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an," or "the," is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The blocks of a method or algorithm disclosed herein may be embodied in a processor-executable software module, which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

The invention claimed is:

1. A target access volume determination apparatus comprising:
   a rocket processing unit, wherein the rocket processing unit comprises a first processor and wherein the first processor is configured with software executable instructions to cause the rocket processing unit to perform operations comprising:
   receiving a latitude and an altitude of a launcher from which the rocket will be launched and a rocket velocity and a specified trajectory;
   receiving a target altitude ($alt_{sat}$) and a topocentric firing azimuth ($AZ_{topocentric}$) from a set of desired target altitudes and topocentric firing azimuths;
   initializing the processor with values for a launcher firing angle relative to a horizon ($\phi$), wherein $\phi$ is small and positive, an increment of $\phi$ ($d\phi$), a range of the rocket ($\alpha$) equal to zero, and an altitude at burnout ($alt_{bo}$) equal to the altitude of the rocket launcher ($alt_{launcher}$);
   for each desired target altitude ($alt_{sat}$) and topocentric firing azimuth ($AZ_{topocentric}$), determining:
   a magnitude of a rotating earth rocket velocity ($V_{sez}$);
   whether the rocket has sufficient energy to reach $alt_{sat}$ and insufficient energy to achieve orbit;
   when the rocket has sufficient energy to reach $alt_{sat}$ and insufficient energy to achieve orbit:
   determining a value of the rocket's angular range $\alpha$ and an eccentricity (ecc);
   determining the rocket's a, ecc, $\alpha$, $\beta$, and TOF in an inertial frame, wherein a is the semi-major axis, $\beta$ is a target's off-nadir angle to the rocket launcher, and TOF is a time of flight of the rocket from the rocket launcher to the target;
   determining when the current value of $\alpha$ is greater than a previous value of $\alpha$;
   when the current $\alpha$ is less than or equal to the previous value of $\alpha$, then setting $\alpha_{MAX}$ equal to the previous value of $\alpha$ and $a_{MAX}$, $ecc_{MAX}$, $\beta_{MAX}$, and $TOF_{MAX}$ equal to the previous values of a, ecc, $\beta$, and TOF; and when the current $\alpha$ is greater than the previous value of $\alpha$, then incrementing $\phi$ by $d\phi$ and determine a next value of $\alpha$; and an access volume processing unit, wherein the access volume processing unit comprises a second processor and wherein the second processor is configured with software executable instructions to cause the access volume processing unit to perform operations comprising:

for each desired target altitude ($alt_{sat}$) and topocentric firing azimuth ($AZ_{topocentric}$):
receiving $\alpha_{MAX}$, $a_{MAX}$, $ecc_{MAX}$, $\beta_{MAX}$, and $TOF_{MAX}$;
determining a latitude of the satellite $lat_{sat}$ and a longitudinal offset ($\Delta N$) corresponding to $\alpha_{MAX}$, $a_{MAX}$, $ecc_{MAX}$, $\beta_{MAX}$, and $TOF_{MAX}$;
identifying a point defined by $alt_{sat}$, $lat_{sat}$, and $\Delta N$ in an inertial frame relative to a launcher location; and
defining a volume surface from the points determined for each $alt_{sat}$ and $AZ_{topocentric}$ in the set of desired target altitudes and topocentric firing azimuths; and a display and alert processing unit, wherein display and alert processing unit comprises a third processor and wherein the third processor is configured with software executable instructions to cause the display and alert processing unit to perform operations comprising:
receiving the volume surface from the access volume processing unit;
generating a visual representation of a access volume; and
sending the visual representation to a display device for display.

2. The apparatus of claim 1, wherein the software executable instructions further initialize the first processor with an intercept mode selected from the group of an intercept on descent, an intercept on ascent, and a quick-ascent intercept.

3. The apparatus of claim 1, wherein the third processor is further configured with software executable instructions to cause the display and alert processing unit to perform operations comprising:
determining whether the targeted platform is in the access volume; and
issuing an alert when the targeted platform is in the access volume.

4. The apparatus of claim 3, wherein the instruction for issuing an alert comprises an instruction for issuing an alert using at least one media selected from the group consisting of a visual alert, a text alert and an audio alert.

5. The apparatus of claim 1, wherein the target is selected from the group consisting of an orbiting platform and a ballistic projectile.

6. A method for determining the accessibility of a target to an earth-launched rocket for a specified trajectory comprising:
receiving at a rocket processing unit a latitude and an altitude of a launcher from which the rocket will be launched and a velocity of the rocket, wherein the rocket processing unit comprises a first processor;
receiving at the rocket processing unit a target altitude ($alt_{sat}$) and a topocentric firing azimuth ($AZ_{topocentric}$) from a set of desired target altitudes and topocentric firing azimuths;
initializing the first processor with values for a launcher firing angle relative to a horizon ($\phi$), wherein $\phi$ is small and positive, an increment of $\phi$ ($d\phi$), a range of the rocket ($\alpha$) equal to zero, and an altitude at burnout ($alt_{bo}$) equal to the altitude of the rocket launcher ($alt_{launcher}$);
for each desired target altitude ($alt_{sat}$) and topocentric firing azimuth ($AZ_{topocentric}$):
using the first processor to determine a magnitude of a rotating earth rocket velocity ($V_{sez}$); and
using the first processor to determine whether the rocket has sufficient energy to reach $alt_{sat}$ and insufficient energy to achieve orbit;
when the rocket has sufficient energy to reach $alt_{sat}$ and insufficient energy to achieve orbit:
using the first processor to determine a value of the rocket's angular range $\alpha$ and an eccentricity (ecc);
using the first processor to determine the rocket's a, ecc, $\alpha$, $\beta$, and TOF in an inertial frame, wherein a is the semi-major axis, $\beta$ is a target's off-nadir angle to the rocket launcher, and TOF is a time of flight of the rocket from the rocket launcher to the target; and
using the first processor to determine when the current value of $\alpha$ is greater than a previous value of $\alpha$;
when the current $\alpha$ is less than or equal to the previous value of $\alpha$, then using the first processor for setting $\alpha_{MAX}$ equal to the previous value of $\alpha$ and $a_{MAX}$, $ecc_{MAX}$, $\beta_{MAX}$, and $TOF_{MAX}$ equal to the previous values of a, ecc, $\beta$, and TOF; and
when the current $\alpha$ is greater than the previous value of $\alpha$, then using the first processor for incrementing $\phi$ by $d\phi$ and for determining a next value of $\alpha$; and
for each desired target altitude ($alt_{sat}$) and topocentric firing azimuth ($AZ_{topocentric}$):
receiving at an access volume processing unit $\alpha_{MAX}$, $a_{MAX}$, $ecc_{MAX}$, $\beta_{MAX}$, and $TOF_{MAX}$, wherein the access volume processing unit comprises a second processor;
using the second processor to determine a latitude of the satellite $lat_{sat}$ and a longitudinal offset ($\Delta N$) corresponding to $\alpha_{MAX}$, $a_{MAX}$, $ecc_{MAX}$, $\beta_{MAX}$, and $TOF_{MAX}$;
using the second processor to identify a point defined by $alt_{sat}$, $lat_{sat}$, and $\Delta N$ in an inertial frame relative to a launcher location; and
using the second processor to define a volume surface from the points determined for each $alt_{sat}$ and $AZ_{topocentric}$; and
receiving the volume surface from the access volume processing unit at a display and alert processing unit, wherein the display and alert processing unit comprises a third processor;
using the third processor to generate a visual representation of a access volume; and
using the third processor to send the visual representation to a display device for display.

7. The method of claim 1 further comprising initializing the first processor with an intercept mode selected from the group of an intercept on descent, an intercept on ascent, and a quick ascent intercept.

8. The method of claim 1 further comprising:
using the third processor to determine whether the targeted platform is in the access volume; and
using the third processor to issue an alert when the targeted platform is in the access volume.

9. The method of claim 8, wherein issuing an alert comprises issuing an alert using at least one media selected from the group consisting of a visual alert, a text alert and an audio alert.

10. The method of claim 1, wherein the target is selected from the group consisting of an orbiting platform and a ballistic projectile.

11. A target access volume determination apparatus comprising:
- a rocket processing unit, wherein the rocket processing unit comprises a first processor and wherein the first processor is configured with software executable instructions to cause the rocket processing unit to perform operations comprising:
  - receiving a set of desired arrival azimuths of a rocket $\gamma$, a muzzle velocity $V_m$ of the rocket, an altitude of the rocket launcher ($alt_{launcher}$) from which the rocket will be launched, a specific launch trajectory, and a target altitude $alt_{sat}$;
  - initializing the first processor by setting a value for a rotating earth rocket velocity ($V_{sez}$) to $V_m$;
  - for each desired arrival azimuth of a rocket $\gamma$ at the target altitude $alt_{sat}$:
    - (a) determining the rocket's a, ecc, $\alpha$, $\beta$, and TOF in an inertial frame, wherein a is the semi-major axis, $\beta$ is a target's off-nadir angle to the rocket launcher, and TOF is a time of flight of the rocket from the rocket launcher to the target; and
    - (b) determining a current value of the rocket's angular range $\alpha$;
    - (c) when the current $\alpha$ is not equal to $\pi$ or to 0, then determining a current value of the rotating earth rocket velocity ($V_{sez}$); and
    - (d) determining when the current value of $V_{sez}$ is approximately equal to a just previous value of $V_{sez}$;
    - when the current value of $V_{sez}$ is not approximately equal to a just previous value of $V_{sez}$, then initializing the first processor with the current $V_{sez}$ and performing operations (a)-(d); and
    - when the current value of $V_{sez}$ is approximately equal to the just previous value of $V_{sez}$, then determining $lat_{launcher}$ and longitudinal offset ($\Delta N$); and
- an access volume processing unit, wherein the access volume processing unit comprises a second processor and wherein the second processor is configured with software executable instructions to cause the access volume processing unit to perform operations comprising:
  - receiving the $lat_{launcher}$ and longitudinal offset ($\Delta N$), wherein $lat_{launcher}$ and longitudinal offset ($\Delta N$) determine a point in an inertial frame relative to the target; and
  - identifying a accessibility region constructed from points determined for the selected $alt_{sat}$ over the set of desired arrival azimuths $\gamma$; and
- a display and alert processing unit, wherein display and alert processing unit comprises a third processor and wherein the third processor is configured with software executable instructions to cause the display and alert processing unit to perform operations comprising:
  - receiving the region from the access accessibility processing unit;
  - using the third processor to generate a visual representation of a accessibility region; and
  - using the third processor to send the visual representation to a display device for display.

12. The apparatus of claim 11 further comprising initializing the first processor with an intercept mode selected from the group of an intercept on descent, an intercept on ascent, and a quick ascent intercept.

13. The apparatus of claim 11 further comprising:
- using the third processor to determine whether a rocket launcher is in the accessibility region; and
- using the third processor to issue an alert when the rocket launcher is in the access volume.

14. The apparatus of claim 13, wherein issuing an alert comprises issuing an alert using at least one media selected from the group consisting of a visual alert, a text alert and an audio alert.

15. The apparatus of claim 11, wherein the target is selected from the group consisting of an orbiting platform and a ballistic projectile.

16. A method for determining the accessibility of a target to an earth-launched rocket comprising:
- receiving at a rocket processing unit a set of desired arrival azimuths of a rocket $\gamma$, a muzzle velocity $V_m$ of the rocket, an altitude of the rocket launcher ($alt_{launcher}$) from which the rocket will be launched, and a target altitude $alt_{sat}$, wherein the rocket processing unit comprises a first processor;
- initializing the first processor by setting a value for a rotating earth rocket velocity ($V_{sez}$) to $V_m$;
- for each desired arrival azimuth of a rocket $\gamma$ at the target altitude $alt_{sat}$:
  - (a) using the first processor to determine the rocket's a, ecc, $\alpha$, $\beta$, and TOF in an inertial frame, wherein a is the semi-major axis, $\beta$ is a target's off-nadir angle to the rocket launcher, and TOF is a time of flight of the rocket from the rocket launcher to the target; and
  - (b) using the first processor to determine a current value of the rocket's angular range $\alpha$;
  - (c) when the current $\alpha$ is not equal to $\pi$ or to 0, then using the first processor to determine a current value of the rotating earth rocket velocity ($V_{sez}$); and
  - (d) using the first processor to determine when the current value of $V_{sez}$ is approximately equal to a just previous value of $V_{sez}$;
  - when the current value of $V_{sez}$ is not approximately equal to a just previous value of $V_{sez}$, then initializing the first processor with the current $V_{sez}$ and performing steps (a)-(d);
  - when the current value of $V_{sez}$ is approximately equal to the just previous value of $V_{sez}$, then using the first processor to determine $lat_{launcher}$ and longitudinal offset ($\Delta N$);
- receiving at a accessibility processing unit the $lat_{launcher}$ and longitudinal offset ($\Delta N$), wherein the access volume processing unit comprises a second processor and wherein $lat_{launcher}$ and longitudinal offset ($\Delta N$) determine a point in an inertial frame relative to the target;
- using the second processor to identify a accessibility region constructed from points determined for the selected $alt_{sat}$ over the set of desired arrival azimuths $\gamma$;
- receiving the region from the access accessibility processing unit at a display and alert processing unit, wherein the display and alert processing unit comprises a third processor;
- using the third processor to generate a visual representation of a accessibility region; and
- using the third processor to send the visual representation to a display device for display.

17. The method of claim 11 further comprising initializing the first processor with an intercept mode selected from the group of an intercept on descent, an intercept on ascent, and a quick-ascent intercept.

18. The method of claim 11 further comprising:
using the third processor to determine whether a rocket launcher is in the accessibility region; and
using the third processor to issue an alert when the rocket launcher is in the access volume.

19. The method of claim 13, wherein issuing an alert comprises issuing an alert using at least one media selected from the group consisting of a visual alert, a text alert and an audio alert.

20. The method of claim 11, wherein the target is selected from the group consisting of an orbiting platform and a ballistic projectile.

* * * * *